S. H. WALKER.
Bee Hive.
No. 24,251.  Patented May 31, 1859.
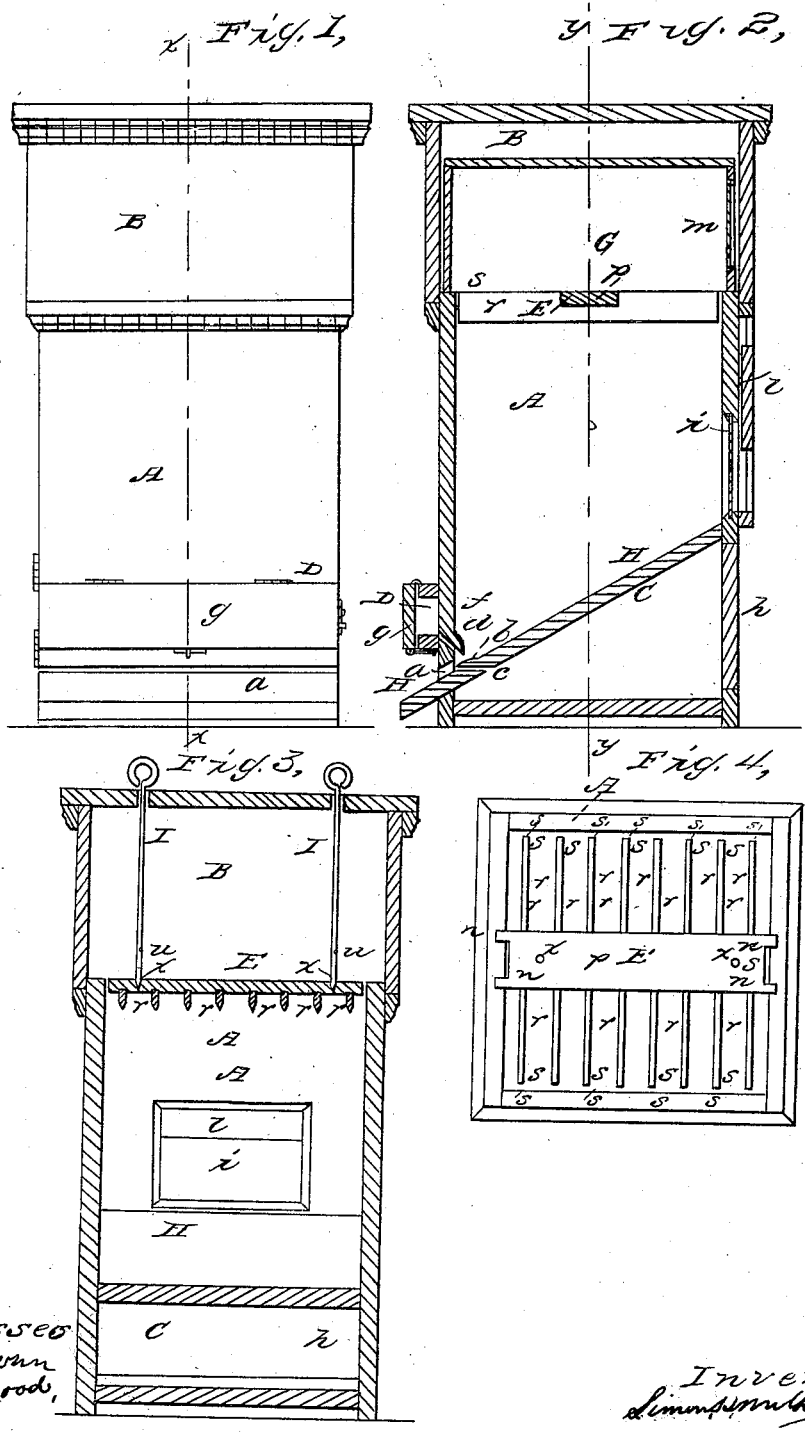

UNITED STATES PATENT OFFICE.

SIMON H. WALKER, OF SOMERVILLE, TENNESSEE.

BEEHIVE.

Specification of Letters Patent No. 24,251, dated May 31, 1859.

*To all whom it may concern:*

Be it known that I, SIMON H. WALKER, of Somerville, in the county of Fayette and State of Tennessee, have invented a new and Improved Beehive; and I do hereby declare that the following is a full and exact description thereof, reference being had to the accompanying drawings, making part of this specification, Figure 1 being a front elevation of my improved beehive; Fig. 2, a vertical section thereof in the plane indicated by the line $x$ $x$, Fig. 1; Fig. 3, a vertical section thereof in the plane indicated by the line $y$ $y$, Fig. 2; Fig. 4, a plan of the top of the brood-box.

Like letters designate corresponding parts in all the figures.

I construct the hive proper, including the brood-box A, of material, and in manner of uniting, according to any convenient mode, the horizontal dimensions thereof being about one foot, inside, and its height sufficient to give the best established size to the brood-box, and to allow a moth apartment C, in the lower part. The bottom H, of the brood-box, is most properly placed in an inclined position, as shown in Fig. 2, the front edge being lowest, and projecting outward somewhat from the hive, to serve as a lighting board, or step. By this arrangement, (although I do not claim it as new) not only do the bees more readily clear out their filth, but my method of moth decoys is most conveniently applied, in the following manner:—My improved moth decoys are constructed and arranged on principles founded on the observed nature and habits of the moth miller:—thus their instinct leads them to seek the honeycomb, about or near which they may deposit their eggs; and for that purpose they naturally seek to enter where the bees do, but to escape the vengeance of the proper possessors of the hives, they immediately seek hiding places where the bees may not be able to approach and destroy them, and hence enter the first openings or crevices which they can find impassable or unapproachable to the bees. Therefore, instead of locating the moth decoys away from, I allow the moth millers to pass into, the bee entrance $a$, and place two decoy entrances, just inside of said bee entrance, one at $c$, (Fig. 2,) through the bottom H, into the apartment C, and the other, at $f$, (Fig. 2,) through the front side of the hive, into a decoy chamber or box D, situated just above the bee entrance, on the front of the hive. These decoy entrances are made large enough to allow the moth miller to enter, but not large enough for any of the bees to enter. Just inward beyond the mouth of the decoy entrances $c$, $f$, are secured respectively small raised lips or ledges, $b$, and $d$, jutting over the said mouths of the decoy entrances, substantially as shown in Fig. 2. These lips are shaped so as to allow the bees to readily pass respectively over and beneath them; but by presenting a barrier across the entire entrance of the hive, both above and below, to the progress of the moth miller, which naturally keeps stealthily close to the surface over which it passes, they almost infallibly direct it into the decoy entrances. The decoy apartments C and D, are provided with suitable doors $h$, and $g$, by which access is had to said apartments, wherein pieces of honey-comb are placed to attract the moth millers. From time to time, the apartments are to be examined, and all eggs or moths found therein are to be destroyed.

Instead of permanent cross-bars, secured separately in the top of brood-box A, to guide the bees in the construction of the combs, I employ a set of cross-bars $r$ $r$ or attached only to a middle cross-piece $p$, which is secured by tenons $n$, $n$, in notches in the sides of the hive, as shown in Fig. 4. Between the ends of the cross-bars and the sides of the hive spaces $s$ $s$ are left, as represented, sufficiently wide to allow a knife to be passed along therein. Similar spaces may be left at the ends of the cross-piece $p$, except where its tenons project, but this is not of much consequence. These cross-bars and their cross-piece, thus compose a united system of cross-bars, removable, all at once, by raising their cross-piece $p$, from the notches in which it simply rests; and the spaces $s$, $s$, between them and the sides of the hive allow a knife to be passed all around, to detach the combs, where glued by propolis to the sides of the hive, without disturbing the bees, as is necessary in other arrangements. Thus the comb may be taken from the hive whenever thought to be no longer fit for breeding in, so that the bees may construct new combs for the purpose.

In order further to facilitate the removal of the combs with as little disturbance of the bees, or trouble from them, as possible, I employ a close box, which may be the ordinary super, or honey-box chamber, B, for receiving the honey box or boxes G, Fig. 2. The box, or chamber, B, fits over the upper edge of the hive, where it rests on ledges or projections, as represented, so that it closes tightly the top of the hive. For the purpose here intended the honey-boxes, if any, should first be removed; and two holes are made in the top of the box, about in the positions indicated in Fig. 3, and directly over two corresponding holes $t, t$, in the cross-piece $p$, of the cross-bars. Through the holes in the top of the box B, are inserted lifting rods I, I, which are provided with screws on their lower ends, to be screwed down into the holes $t, t,$ of the cross-piece $p$. A single rod I, may answer the purpose, although I prefer two. And any other mode of securing the rod or rods to the cross-piece $p$, may be employed. All being thus arranged, whenever the brood-comb is to be removed it is first separated from the sides of the hive, by a knife, as above directed, and the box B, with its rods I, I, placed over the hive. Smoke is then blown into the box B, through any suitable aperture, for the purpose of driving the bees down out of the combs into the bottom of the brood-box, the entrance $a$, of which has previously been closed. The rods I, I, are then lifted till the cross-bars $r, r,$ with the combs clinging thereto, are raised up into the box B. The rods may then be secured in that position, by passing pins through holes $u, u,$ therein, over the top of the box B, or in any other convenient manner. This box is then lifted from the hive with all the combs, and another box, chamber, or super, placed thereon instead. The bees will then proceed to make new combs.

I do not claim moth traps placed in or near the entrances of bee-hives; nor do I claim any arrangement of such substantially different from the device herein set forth; but

What I claim as my invention and desire to secure by Letters Patent is—

1. The moth-decoy entrances $c, f,$ provided with the jutting lips, or ledges $b, d,$ and arranged just within the bee entrance $a$, across its entire extent, both above and below, substantially in the manner and for the purpose herein specified.

2. I also claim the construction and arrangement of the cross-bars $r, r,$ attached to a supporting cross-piece $p,$ and with open spaces $s, s,$ around their ends, substantially in the manner and for the purpose herein set forth.

SIMON H. WALKER.

Witnesses:
J. S. BROWN,
R. F. OSGOOD.